US011675071B2

(12) United States Patent
Tang

(10) Patent No.: US 11,675,071 B2
(45) Date of Patent: Jun. 13, 2023

(54) PREDICTING WEATHER RADAR IMAGES

(71) Applicant: International Business Machines Corporation, Armonk, NY (US)

(72) Inventor: Jingyin Tang, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 149 days.

(21) Appl. No.: 17/398,335

(22) Filed: Aug. 10, 2021

(65) Prior Publication Data

US 2021/0373153 A1 Dec. 2, 2021

Related U.S. Application Data

(63) Continuation of application No. 16/592,807, filed on Oct. 4, 2019, now Pat. No. 11,169,263.

(51) Int. Cl.
*G01S 13/95* (2006.01)
*G01W 1/10* (2006.01)
*G01S 13/00* (2006.01)

(52) U.S. Cl.
CPC ............ *G01S 13/951* (2013.01); *G01W 1/10* (2013.01); *G01S 13/953* (2013.01); *G01S 13/958* (2013.01)

(58) Field of Classification Search
None
See application file for complete search history.

(56) References Cited

U.S. PATENT DOCUMENTS

| 3,700,866 A | * | 10/1972 | Taylor ............... G06N 20/00 |
| | | | 700/47 |
| 5,796,611 A | | 8/1998 | Ochiai |
| 5,959,567 A | | 9/1999 | Wolfson |
| 5,974,360 A | | 10/1999 | Otsuka |
| 6,125,328 A | | 9/2000 | Baron |
| 6,128,578 A | | 10/2000 | Sakaino |
| 6,278,947 B1 | | 8/2001 | Baron |
| 6,340,946 B1 | | 1/2002 | Wolfson |

(Continued)

FOREIGN PATENT DOCUMENTS

| CN | 107748942 A | 12/2018 |
| CN | 108983323 A | 12/2018 |

(Continued)

OTHER PUBLICATIONS

"Explanation of Chaining Machine Learning Models with Algorithmia"; posted at blockgeni.com; dated Aug. 27, 2019; No. author listed. (Year: 2019).*

(Continued)

*Primary Examiner* — Bernarr E Gregory
(74) *Attorney, Agent, or Firm* — David K. Mattheis

(57) ABSTRACT

Predicting weather radar images by building a first machine learning model to generate first predictive radar images based upon input weather forecast data, and a second machine learning model to generate second predictive radar images based upon historical radar images and the first predictive radar images. Further by generating enhanced predictive radar images by providing the first machine learning model weather forecast data for a location and time and providing the second machine learning model with historical radar images for the location and an output of the first machine learning model.

25 Claims, 5 Drawing Sheets

(56) References Cited

U.S. PATENT DOCUMENTS

| | | | |
|---|---|---|---|
| 6,513,025 B1* | 1/2003 | Rosen | G06N 5/025 |
| | | | 706/45 |
| 6,850,184 B1 | 2/2005 | Desrochers | |
| 6,961,061 B1* | 11/2005 | Johnson | H04N 5/272 |
| | | | 345/473 |
| 7,542,852 B1 | 6/2009 | Rose | |
| 8,625,840 B2 | 1/2014 | Ravela | |
| 9,244,157 B1* | 1/2016 | Sishtla | G01S 13/953 |
| 11,169,263 B2* | 11/2021 | Tang | G01S 13/951 |
| 2002/0114517 A1 | 8/2002 | Wolfson | |
| 2003/0156734 A1 | 8/2003 | Wolfson | |
| 2007/0005249 A1 | 1/2007 | Dupree | |
| 2012/0207343 A1 | 8/2012 | Ravela | |
| 2018/0313975 A1 | 11/2018 | Chen | |
| 2019/0130223 A1* | 5/2019 | Anderson | G06F 18/24 |

FOREIGN PATENT DOCUMENTS

| | | | |
|---|---|---|---|
| CN | 110135654 A | 8/2019 | |
| JP | H0990057 A * | 4/1997 | G01W 1/10 |

OTHER PUBLICATIONS

Fanlin et al., "Automatic Detection of Bow Echoes from Weather Radar Images", Proceedings of the 2018 13th Work Congress on Intelligent Control and Automation Jul. 4-8, 2018, Changsha, China, 6 pps.

Yuanyi, "Research on Tracking and Extrapolation of Rain Clouds Based on Doppler Radar Images", Training unit: School of Information Engineering Discipline Information and Communication Engineering, Paper submission date Apr. 2016, 84 pps. (English Abstract Only).

Chinese Office Action dated Oct. 17, 2022 from Chinese Application No. 202080063765.3 filed Oct. 17, 2022.

"Predicting Weather Radar Images", International Application No. PCT/IB2020/058D30, Applicant's or agent's file reference P201807062, International filing date Sep. 24, 2020, 24 pages.

Gamba et al., "SRTM Data Characterization in Urban Areas", May 2012, 5 pages.

Klein et al., "A Dynamic Convolutional Layer for Short Range Weather Prediction", pp. 4840-4848, © 2015 IEEE.

Li et al., "Nowcasting of Motion and Growth of Precipitation with Radar over a Complex Orography", Journal of Applied Meteorology, vol. 34, Jun. 1995, Manuscript received Dec. 2, 1993, in final form Nov. 1, 1994, pp. 1286-1300.

Liang et al., A Composite Approach of Radar Echo Extrapolation Based on TREC Vectors in Combination with Model-Predicted Winds, Advances in Atmospheric Sciences, vol. 27, No. 5, 2010, pp. 1119-1130; revised Dec. 15, 2009.

Mecklenburg et al., "Improving the nowcasting of precipitation in an Alpine region with an enhanced radar echo tracking algorithm", Journal of Hydrology 239 (2000) pp. 46-68; revised Jan. 27, 2000 accepted Sep. 21, 2000.

Nagarajan, Aditya, "Explorations into Machine Learning Techniques for Precipitation Nowcasting", Masters Theses, Master of Science in Industrial Engineering and Operations Research, University of Massachusetts Amherst, Feb. 2017, 108 pages, < https://scholarworks.umass.edu/masters_theses_2/480>.

Patent Cooperation Treaty, Notification of Transmittal of the International Search Report and the Written Opinion of the International Searching Authority, or the Declaration, dated Jan. 15, 2021, 9 pages.

Rinehart et al., "Three-dimensional storm motion detection by conventional weather radar", Nature vol. 273, May 25, 1978, pp. 287-289; accepted Mar. 22, 1978.

Shi et al., "Convolutional LSTM Network: A Machine Learning Approach for Precipitation Nowcasting", arXiv:1506.04214v2 [cs.CV] Sep. 19, 2015, 12 pages.

Shi et al., "Deep Learning for Precipitation Nowcasting: A Benchmark and A New Model", 31st Conference on Neural Information Processing Systems (NIPS 2017), Long Beach, CA, USA, 11 pages.

Singh et al., "A Deep Learning Based Approach with Adversarial Regularization for Doppler Weather Radar ECHO Prediction," 2017 IEEE International Geoscience and Remote Sensing Symposium (IGARSS), Fort Worth, TX, 2017, pp. 5205-5208, 2017.

Tang, et al., "A Nowcasting Model for Tropical Cyclone Precipitation Regions Based on the TREC Motion Vector Retrieval with a Semi-Lagrangian Scheme for Doppler Weather Radar", MDPI, Atmosphere 2018, 9, 200, 18 pages; Accepted: May 18, 2018; Published: May 21, 2018, doi:10.3390/atmos9050200.

Tran, et al., "Computer Vision in Precipitation Nowcasting: Applying Image Quality Assessment Metrics for Training Deep Neural Networks", MDPI, Atmosphere 2019, 10, 244, doi:10.3390/atmos10050244, Accepted: Apr. 26, 2019; Published: May 2, 2019, 20 pages.

Tuttle et al., "A Single-Radar Technique for Estimating the Winds in Tropical Cyclones", Bulletin of the American Meteorological Society, vol. 80, No. 4, Apr. 1999, pp. 653-668, In final form Nov. 20, 1998, © 1999 American Meteorological Society.

Tuttle et al., "Determination of the Boundary Layer Airflow from a Single Doppler Radar", Journal of Atmospheric and Oceanic Technology, vol. 7, Apr. 1990, pp. 218-232, (Manuscript in final form Jul. 22, 1989).

U.S. Appl. No. 16/592,807, filed Oct. 4, 2019.

Wang et al., "Application of Multi-Scale Tracking Radar Echoes Scheme in Quantitative Precipitation Nowcasting", Advances in Atmospheric Sciences, vol. 30, No. 2, 2013, pp. 448-160; revised Jun. 27, 2012.

Zhang et al., "Estimation of Weather Radar Echo Motion Field and Its Application to Precipitation Nowcasting", Acta Meteorologica Sinica, May 2006, 20 pages.

IBM Appendix P, "List of patent and patent applications treated as related", Filed Herewith, 2 pages.

* cited by examiner

PREDICTING WEATHER RADAR IMAGES

This application is a continuation of U.S. patent application Ser. No. 16/592,807, filed Oct. 4, 2019, now U.S. Pat. No. 11,169,263.

BACKGROUND

The disclosure relates generally to predicting weather radar echo images. The disclosure relates particularly to using deep learning and Numeric Weather Prediction (NWP) models.

Weather prediction may be characterized as either forecasting, or nowcasting. Forecasting relates to the prediction of future weather conditions using complex numeric models incorporating historic data as well as physical dynamic and thermodynamic calculation models. Nowcasting typically relates to a detailed description of weather conditions forecast for the next 0-6 hour time period.

Radar nowcasting seeks to generate realistic images of future radar echo images. Realistic radar images provide a basis for aviation flight-path decision making as well as higher quality forecasts of short-term, future precipitation.

Radar echo images relate to the amount of moisture present in the atmosphere. The moisture reflects the radar signal leading to an image based upon the strength of the returning signal. Precipitation is the amount of moisture which falls to the ground. Typically, not all atmospheric moisture becomes precipitation. Efforts to convert precipitation levels and rates to radar reflectivity images can be inaccurate. (A 10 cm equivalent reflectivity computed from precipitation data generally does not look like the actual radar reflectivity image associated with the precipitation data).

Radar nowcasting focuses on predictions for the next 0-6 hours, unlike general weather forecasting, which may make predictions for the next 10 days of more. Radar nowcasting requires models which can be processed quickly and provide outputs having temporal resolution measured in minutes and high spatial resolution as well. Forecasting typically utilizes large, computationally intensive models spanning large time frames and generating outputs with coarser spatial and temporal resolution.

Radar-only based nowcasting is typically based upon images from a single radar location. Tracking radar echo by correlation (TREC) calculates correlation coefficients between successive images of radar echoes and uses the maximum correlation values to determine the motion vectors of different regions. The determined vectors are then used to predict future movement of the regions. TREC is image based with no regard for the scale of internal dynamics of weather region elements.

Continuity of TREC (COTREC) imposes a vector continuity constraint upon TREC where TREC predicts wind velocity poorly. Efforts to improve COTREC have added a parameter related to cloud growth and decay. Additional efforts have added shape analysis of precipitation events to COTREC to improve the predicted motion vector field, improving accuracy of the predictions.

TREC occasionally yields a vector in a direction contradictory to surrounding vectors. One effort to address this issue extended the correlation determination to three consecutive images from two.

A multi-scale TREC model uses a first low-resolution TREC calculation to determine synoptic-scale motion of regions. A second, high-resolution TREC calculation is then performed on each large, low-resolution region to predict meso, local-scale internal motion within each large region.

Machine learning has been applied to radar nowcasting by training a neural network to analyze sequences of radar images and to make future image predictions based upon the processed sequence of images without regard for dynamic and thermodynamic conditions. The decoupling time (the length of time before the predictions and actual events have no similarity) of such methods is low, 1~2 hours.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that enable predicting weather radar echo images from weather forecast and radar image data.

In one aspect, the invention includes methods, systems and computer readable media associated with predicting weather radar images by building a first machine learning model to generate first predictive radar images based upon input weather forecast data, and a second machine learning model to generate predictive radar images based upon historical radar images and the first predictive radar images. Further by generating predictive radar images by providing the first machine learning model weather forecast data for a location and time and providing the second machine learning model with historical radar images for the location and an output of the first machine learning model.

In one aspect the invention includes methods, systems, and computer readable media associated with predicting weather radar images by interpolating weather simulation data to increase the spatial and temporal resolution of the data, building a first machine learning model to generate first predictive radar images based upon the interpolated weather forecast data, and building a second machine learning model to generate predictive radar images based upon historical radar images and the first predictive radar images. Further by generating predictive radar images from the second machine learning model by providing the first machine learning model weather forecast data for a location and time and providing the second machine learning model with radar images for the location and time and an output of the first machine learning model. The resolution of the predictive radar images is then enhanced using a third machine learning model.

In one aspect the invention includes methods, systems, and computer readable media associated with predicting weather radar images by interpolating weather simulation data to increase the spatial and temporal resolution of the data, building a first machine learning model using interpolated historic weather simulation and radar image data to generate first predictive radar images based upon current interpolated weather forecast data, and building a second machine learning model using historic and first radar image data to generate predictive radar images based upon historical radar images and the first predictive radar images. Further by generating predictive radar images from the second machine learning model by providing the first machine learning model current interpolated weather forecast data for a location and time and providing the second machine learning model with radar images for the location and time and an output of the first machine learning model. The resolution of the predictive radar images is then enhanced using a third machine learning model.

In one aspect, the invention includes methods, systems and computer readable media associated with predicting weather radar images by receiving current weather forecast data and radar images associated with the current weather forecast data, using a first machine learning model to generate first radar images based upon the current weather forecast data, and using a second machine learning model to generate predictive radar images based upon current radar images and the first radar images.

Aspects of the disclosed systems, methods and computer readable media expand the decoupling time of the radar image nowcasting to 3-6 hours by combining NWP data and machine learning methods. The disclosed inventions enhance the radar nowcasting images by using machine learning to translate NWP forecast data into radar reflectivity images. The use of machine learning models to translate the NWP data produces realistic cloud footprint images which accurately predict future precipitation events. (Predicted radar images are realistic in that they look like actual radar images.) The use of a third machine learning model provides fine spatial resolution across the entire nowcasting window of predicted images. The disclosed inventions can be extended to provide altitude specific radar images (e.g., ground based images or aviation altitude-based images) by building the first machine learning model using altitude specific images and providing the second machine learning model with altitude specific radar image sequences.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
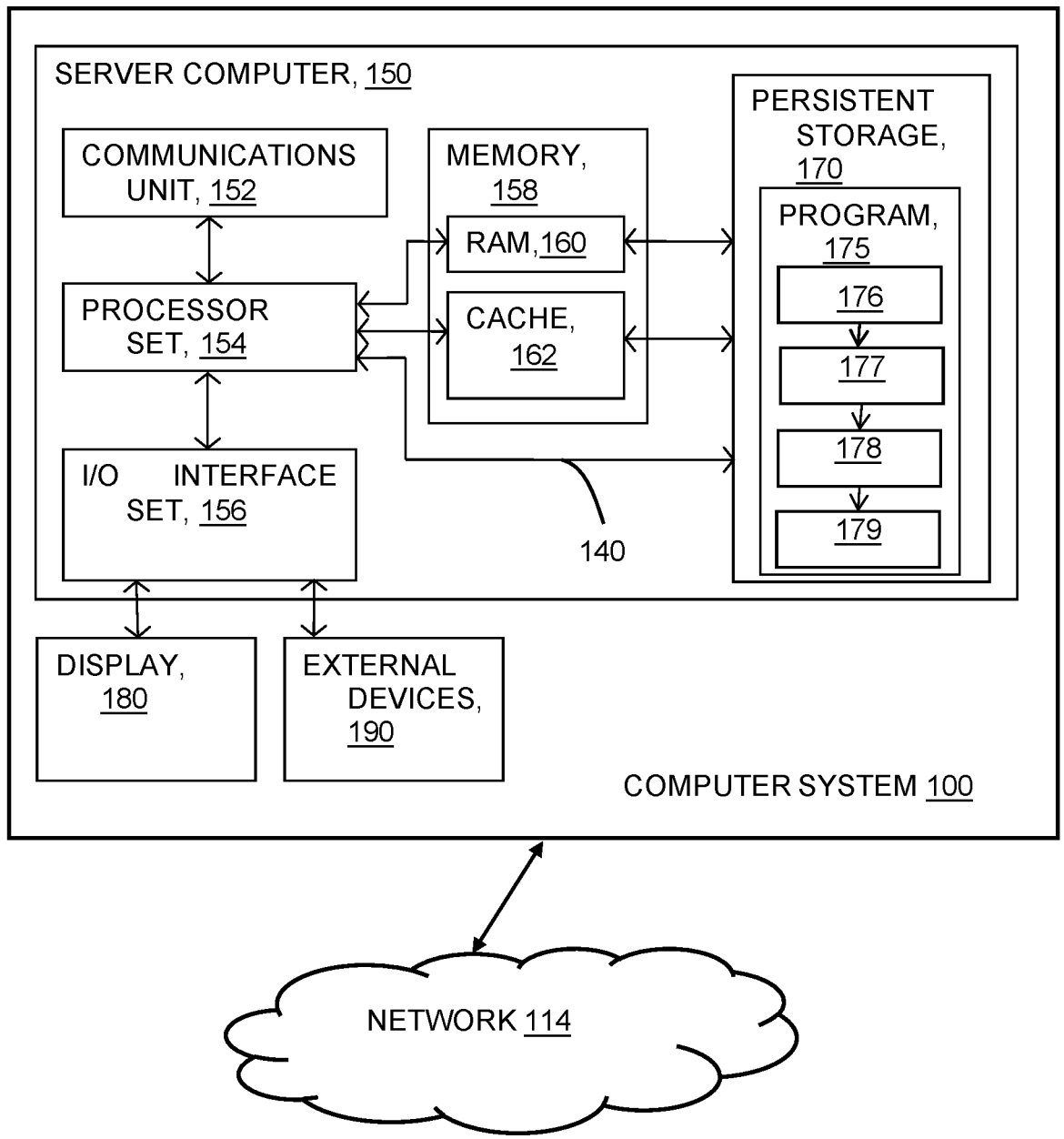
FIG. 1 provides a schematic illustration of a system, according to an embodiment of the invention.

The disclosed inventions yield improvements to radar image nowcasting by the combination two machine learning models. For each time-step of the nowcasting window, the first model takes current prediction data from an NWP forecast model for the time-step and produces radar reflectivity images illustrative of the forecast data. (Thereby incorporating the most up-to-date measure of dynamic and thermodynamic conditions into the nowcasting prediction.) The method uses these time-step specific radar images of forecast conditions, in conjunction with a sequence of current radar images, to generate a predictive image for the next time step of the nowcasting window by the second model. The disclosed inventions proceed from the beginning of the nowcasting window to the end of the window. The method then uses a predictive radar image from each time step as part of the sequence of current radar images for generating the predictive radar image for the next time step.

In an embodiment, a study domain is defined for nowcasting. The study domain may be automatically to manually selected. In an embodiment, automatic study domain selection proceeds according to historic data regarding user preferences and previous study domain selections. In this embodiment, the method defines the study domain as a rectangular geographic region. (Non-rectangular regions may be designated as the study domain). In an embodiment, the area of the continental United States, is defined as the study domain. In an embodiment, the method divides the United States into sub-regions, in this embodiment, the method defines Northeast, Southeast, Northwest, Southwest, Alaska, and Hawaii/Pacific, regions. For the study domain, the method divides the area of the domain and defines a set of rows dividing the domain North-South with each row representing a portion of the overall domain N-S distance divided by a user selected nowcasting resolution (typically between 250 meters (0.155 miles) and 1 kilometer (0.62 miles)). The method further defines the study domain as a set of columns, each column representing the overall E-W distance of the domain divided by the selected resolution.

In this embodiment, increasing the size and resolution of the definition of the study domain requires additional computing resources in terms of CPU capacity, system memory, GPU speed and memory, to generate the nowcasting output in a reasonable amount of time. In an embodiment, the continental US can be processed as the study domain at a spatial resolution of 1 kilometer using a computer having equipped with two NVIDIA GTX 1080 graphics cards, 32 GB memory, one Intel 6700K CPU and 1 TB hard disk space.

In an embodiment, the method comprises four modules: a spatial-temporal interpolation module, an NWP radar mapping module (model M, a radar prediction module (model A), and a spatial downscaling module (model D). In this embodiment, after defining the study domain, the use begins by selecting an initial temporal resolution (e.g., 2 min, 5 min, etc.), and an initial spatial resolution (e.g., 1 km). In this embodiment, the method obtains NWP data for the study domain. In this embodiment, the NWP data includes data having a resolution of at least about 3 km (1.86 miles) and covers a time period at least as long as the desired nowcasting time window (e.g., 6 hours).

In an embodiment, the NWP data includes: precipitable water, outgoing longwave radiation, cumulative and non-cumulative precipitation rate, troposphere pressure, troposphere temperature, surface pressure, surface temperature, convective available potential energy (CAPE), mean sea-level pressure, 850 mb geospatial height, 10 m u-wind, 10 m v-wind, mixing ratio, and sea-land mask. In an embodiment, the NWP data may comprise accumulated precipitation rather than the non-cumulative precipitation rate requiring the method to take a derivative of the data to compute a non-cumulative precipitation rate in an initial NWP data set. In an embodiment, the NWP data may further comprise turbulent kinetic energy, heat flux, mixing height, land use, cloud cover mask, and precipitation type in an expanded NWP data set.

In an embodiment, the method interpolates each variable of the NWP data set into the user specified temporal resolution. In this embodiment, the method uses an interpolation function such as Piecewise Cubic Hermite Interpolating Polynomial (PCHIP) or a Modified Akima spline interpolation (mAkima) function to avoid overshot values between sampled points. In this embodiment, for each time step following the temporal interpolation, the method interpolates the data and downscales the resolution to the user specified spatial resolution. In this embodiment, the method uses natural neighbor interpolation for non-stationary variable data and Krigin interpolation for all stationary variable data.

In an embodiment, the method receives or obtains radar reflectivity images over the area of the study domain for the time period of the NWP data. In this embodiment, the radar reflectivity images may comprise a single radar station image or a mosaic of images from a plurality of radar locations. In an embodiment, the radar reflectivity images may be base reflectivity images, composite reflectivity images, constant altitude plan position (CAPPI) images, or other reflectivity images which best fit the desired end use envisioned for the models of the method. (e.g., a model intended to produce aviation altitude radar predictions for flight plan guidance would obtain aviation altitude radar images). In this embodiment, the radar image resolution is at least as fine as the user specified spatial resolution.

In an embodiment, the method uses the interpolated NWP data and radar images to train the first machine learning model, mapping model M. In this embodiment, the first model comprises a convolutional neural network (CNN) such as INCEPTION V3 for image classification, other known types of CNN may also be used for the methods of the invention. (Note: the terms "INCEPTION", "INCEPTION V3", and "NVIDIA", may be subject to trademark rights in various jurisdictions throughout the world and sed here only in reference to the products or services properly denominated by the marks to the extent that such trademark rights may exist).

In an embodiment, the input data comprises data pairs of interpolated NWP and radar reflectivity data having the same time stamp. In this embodiment, the method normalizes all NWP data into a 0-1 scale using; $[(p_i - p_{min})/(p_{max} - p_{min})]$, where $p_i$, equals each variable at index (time stamp) i. In an embodiment, the method sets maximum radar reflectivity to 75 decibels (dB) and minimum reflectivity to −15 dB. In this embodiment, the method uses the radar reflectivity images in their original orientation and are also rotated to different orientations to prevent moving trend bias in the trained model. (In one embodiment, the method rotates the images 90, 180 and 270 degrees, though other rotations are possible). The method trains model M using unlabeled data—data which is not characterized or labeled by a human entity.

In an embodiment, the method gathers seasonal NWP data to train the model M. In an embodiment, the method trains two versions of the model M, a winter version and a summer version, or a cold rain version and a warm rain version. After the two models are trained the method utilizes whichever model of the winter/summer pair most closely corresponds to the current conditions associated with the desired radar nowcasting window.

In an embodiment, the method trains the model M using the initial NWP data set described above. In one embodiment, the method uses the expanded NWP data set described above to train the model. In these embodiments, the method then evaluates the weights associated with the respective variables to determine if one or more variables are poorly represented (have little impact) on the output of the model. Variables having little representation/impact are removed from the data set and the model is retrained using the revised data set. This retraining using the revised data set yields a model of less complexity and having fewer computational requirements. In some embodiments, model M is trained using a leaky rectified linear unit activation function and a mean square error regression loss function.

In an embodiment, the second machine learning model, the advection model, or model A, comprises a long-short-term memory/CNN (LSTMC), though other types of recursive and convolutional neural networks may be used as well. In this embodiment, the method uses a window size of six time intervals, though other window sizes could be used to increase or decrease the size of the model. In this embodiment, the training data set includes sequences of radar reflectivity images associated with the time stamps of the NWP data processed by the first neural network model. In this embodiment, the method processes NWP data by the trained model M yielding a radar reflectivity image for a particular future time stamp interval. The method pairs that image with actual radar reflectivity images for time periods immediately prior to the future time stamp interval. The method uses multiple pairings of first model outputs and corresponding radar images sequences to train model A. In some embodiments, model A is trained using a leaky rectified linear unit activation function and a mean square error regression loss function.

In an embodiment, the method trains a third machine learning model. In this embodiment, the third model, the downscaling model, or model D, comprises a CNN, or neural network model having a similar loss function. The method trains this model using a data set comprising National Oceanic and Atmospheric Administration (NOAA) composite reflectivity images including national composite reflectivity products NCZ, and NCR. In this embodiment, the NCZ has a 4 km (2.48 mile) resolution and the NCR has 1 km ((0.62 mile) resolution. In this embodiment, the method crops the images of the NCZ, and NCR as needed to fit the study domain. In this embodiment, the trained model enhances the resolution of provided images similarly to moving from the 4 km (2.48 mile) to 1 km (0.62 mile) resolution change for NCZ and NCR. In some embodiments, model D is trained using a leaky rectified linear unit activation function and a mean square error regression loss function.

In an embodiment, the method utilizes the trained models to create the radar nowcasting image sequence for a 0-6 hour nowcasting window. In this embodiment, the method collects a sequence of radar reflectivity images from time $T_1$ to $T_m$: $R_1$, $R_2$, $R_3$ ... where $T_m$ represents the beginning of the nowcasting window. The prediction window beings at $T_{m+1}$. The method collects NWP data for $T_{m+1}$ and uses model M to generate a radar reflectivity image based upon the NWP data, for $T_{m+1}$: $S_{m+1}$. The method then uses $S_{m+1}$ in conjunction with the radar image sequence $R_1$, $R_2$, $R_3$ ... as inputs to model A to generate the predicted radar reflectivity image $R_{m+1}$, for $T_{m+1}$.

In an embodiment, the method then uses the third machine learning model to enhance the resolution of $R_{m+1}$, to the user specified resolution. In an embodiment, the user specifies the final resolution as the resolution of model A. In this embodiment, the use of the third machine learning model is unnecessary.

In an embodiment, the method moves the time interval forward from $T_{m+1}$, to $T_{m+2+}$. In this embodiment, the method gathers NWP data for $T_{m+2}$ and proceeds as described above using the new NWP data and model M to generate $S_{m+2}$, and adding $R_{m+1}$, the sequence of images used as input to model A to generate $R_{m+2}$. In this embodiment, the method steps through the desired nowcasting window in intervals equal to the user specified temporal resolution until the nowcast is completely generated for the specified window size. In this embodiment, for each new nowcast time interval $T_{k+1}$, the uses the newest prediction of reflectivity as the latest observation of reflectivity. The method then proceeds with the nowcast target interval moving from $T_{m+k}$, to $T_{m+k+1}$.

In an embodiment, the complete nowcasting model of up to three machine learning models resides upon a local device and processes NWP and radar image data received over a network communications connection and providing a local output to a user via a display element such as a video screen. In an embodiment, the complete nowcasting model resides in cloud or edge cloud resources, receiving and processing NWP and radar image data and providing output images over a network communications link to local users via a smart phone or local computer application. In an embodiment, the respective machine learning models of the method are trained using cloud or edge cloud resources. In this embodiment, the trained models are then provided locally for use processing the NWP and radar image data to generate desired nowcasts.

FIG. 1 provides a schematic illustration of exemplary network resources associated with practicing the disclosed inventions. The inventions may be practiced in the processors of any of the disclosed elements which process an instruction stream. As shown in the figure, a computer system 100 comprises a server computer 150. FIG. 1 depicts a block diagram of components of server computer 150 within a networked computer system 100, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning program 175, are stored in persistent storage 170 for execution and/or access by one or more of the respective processor(s) 154 of server computer 150 via cache 162. In this embodiment, program 175 comprises four modules. Data interpolation module 176, receives NWP data and interpolates the data to increase the spatial and temporal resolution of the NWP data. The radar mapping module 177, including model M, receives the interpolated NWP data and generates a predicted radar image mapped to the data. The radar prediction module 178, including model A, receives the mapped image from the mapping module 177, and generates the next predicted radar image. The downscaling module 179, including model D, receives the predicted radar images from prediction module 178, and increases the spatial resolution of the images. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including networked devices by way of network 114. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
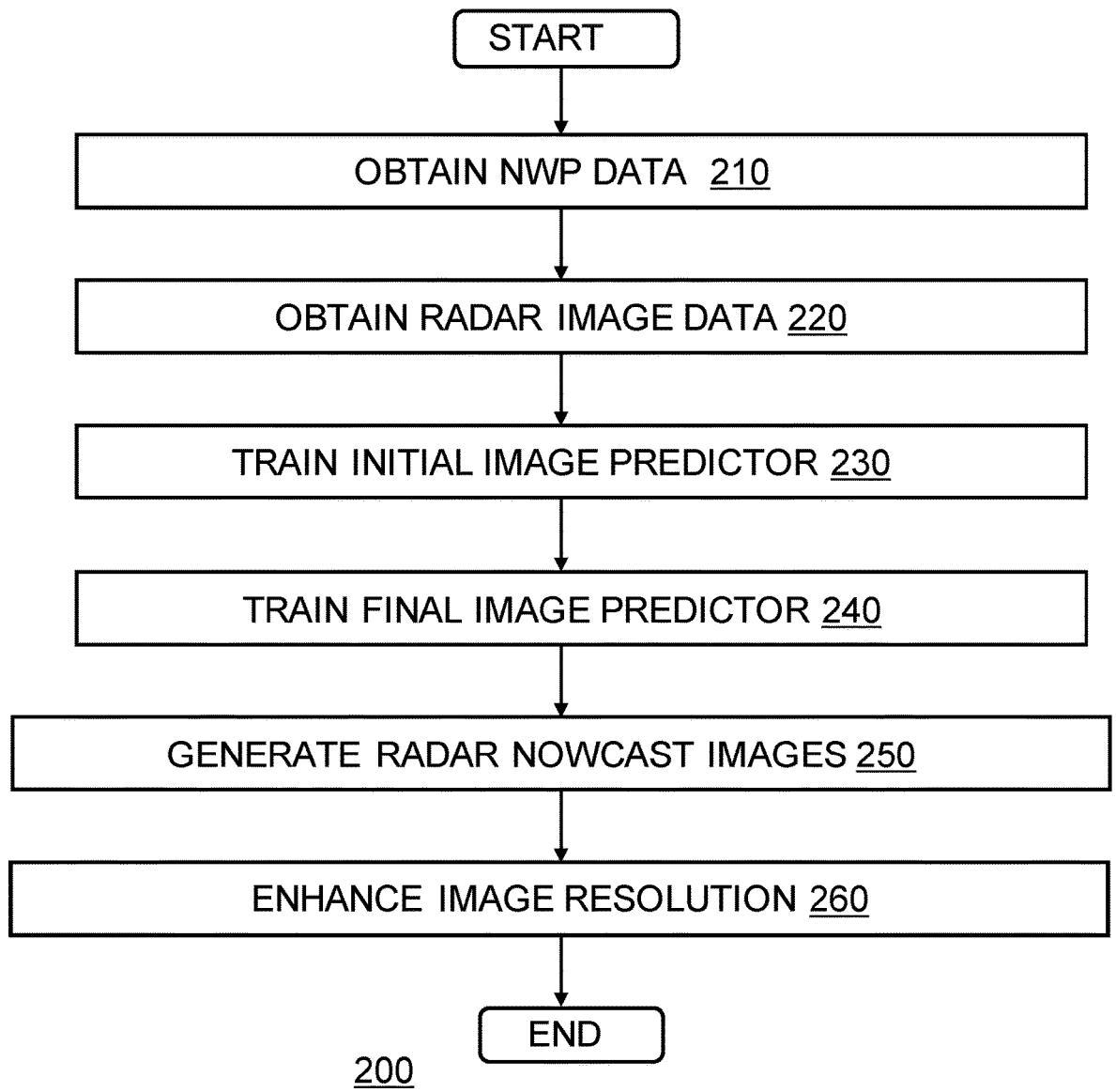
FIG. 2 provides a flowchart depicting an operational sequence, according to an embodiment of the invention.

FIG. 2 provides a flowchart 200, illustrating exemplary activities associated with the practice of the disclosure. After program start, a study domain is defined, user specified spatial and temporal resolutions are set and interpolation module 176 then obtains NWP data for the defined study domain at 210. In an embodiment, the NWP data includes data selected from precipitable water, outgoing longwave radiation, cumulative and non-cumulative precipitation rate, troposphere pressure, troposphere temperature, surface pressure, surface temperature, CAPE, mean sea-level pressure, 850 mb geospatial height, 10 m u-wind, 10 m v-wind, mixing ratio, and sea-land mask, turbulent kinetic energy, heat flux, mixing height, land use, cloud cover mask, and precipitation type.

At 220, the radar mapping module 177 obtains radar reflectivity images for the defined study domain during the time interval of the acquired NWP data set. In this embodiment, radar mapping module 176 of the method may acquire images having the user specified spatial resolution or a lower resolution. In an embodiment, radar mapping module 176, must acquire radar images having at least the user desired temporal resolution for use by the models. In this embodiment, the images may comprise a single sourced or mosaic of multiple sources. The images may comprise base, composite, CAPPI or other radar reflectivity images according to the end use intended for the method. In an embodiment, altitude specific images are gathered to train the overall model to provide altitude specific output images.

In an embodiment, at 230, program 175 trains the model M, of radar mapping module 176, using the radar images and NWP data. In this embodiment, the method normalizes the NWP data and interpolates the data to match the user specified spatial and temporal resolutions for the study domain and nowcasting window respectively. In this embodiment, program 175 of the method normalizes the radar imagery, setting the maximum (75 dB) and minimum (−15 dB) signal values for the imagery data. In an embodiment, program 175 of the method then trains a CNN using the normalized and interpolated data, yielding a first machine learning model which produces a realistic radar reflectivity image from an input of NWP data.

At 240, program 175 trains the model A, of the radar prediction module 177. Program 175 of the method uses radar image sequences paired with output images from model M to train model A. The output of model M predicts the next image in a given sequence. In an embodiment, model A of the method comprises an LSTM model. After training, program 175 uses model A of the prediction module 177, to produce a next predicted radar reflectivity image in a sequence using a given image sequence and corresponding output from model M as inputs.

At 250, program 175 generates radar imagery nowcasting outputs using the trained models from 230 and 240. In an embodiment, interpolation module 176 gathers NWP data for the study domain and the desired nowcasting window. Mapping module 177, gathers radar imagery for the time intervals immediately preceding the nowcasting window. Beginning with an interval of $T_{m+1}$, as the first-time interval of the nowcasting window, program 175 provides normalized NWP data to model M and generates a radar reflectivity prediction, $S_{m+1}$, for interval $T_{m+1}$. In this embodiment, mapping module 177, provides the sequence of radar images ending with $S_{m+1}$ to the radar prediction module 178, and model A. Model A, generates radar image $R_{m+1}$, as the prediction for interval $T_{m+1}$. In an embodiment, at 260 model D, of downscaling module 179 enhances the resolution of $R_{m+1}$, using $R_{m+1}$, as an input and yielding a radar image having the user specified spatial resolution.

In an embodiment, program 175 generates a radar image for each time interval of the desired nowcasting window, using the $R_{m+1}$ from each previous interval as part of the sequence of images provided as input to model A.

Figure 3:
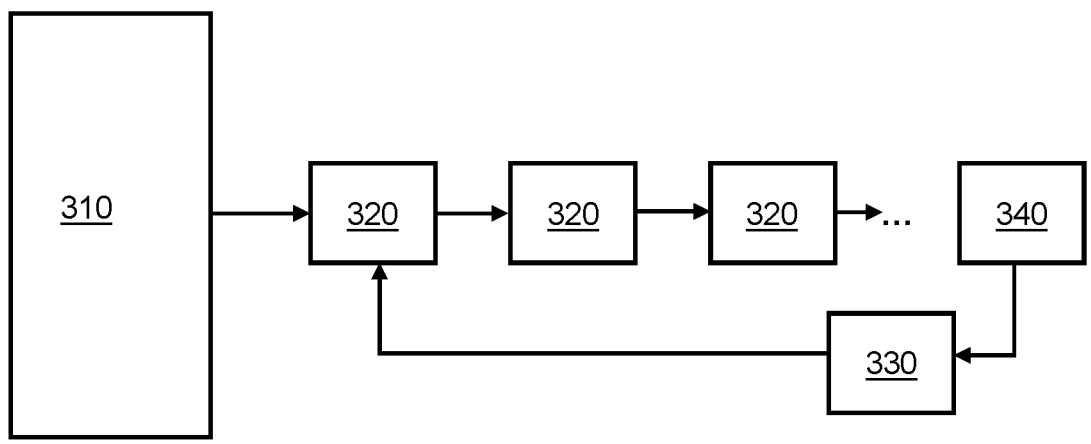
FIG. 3 provides a schematic illustration of a machine learning model, according to an embodiment of the invention.
Figure 4:
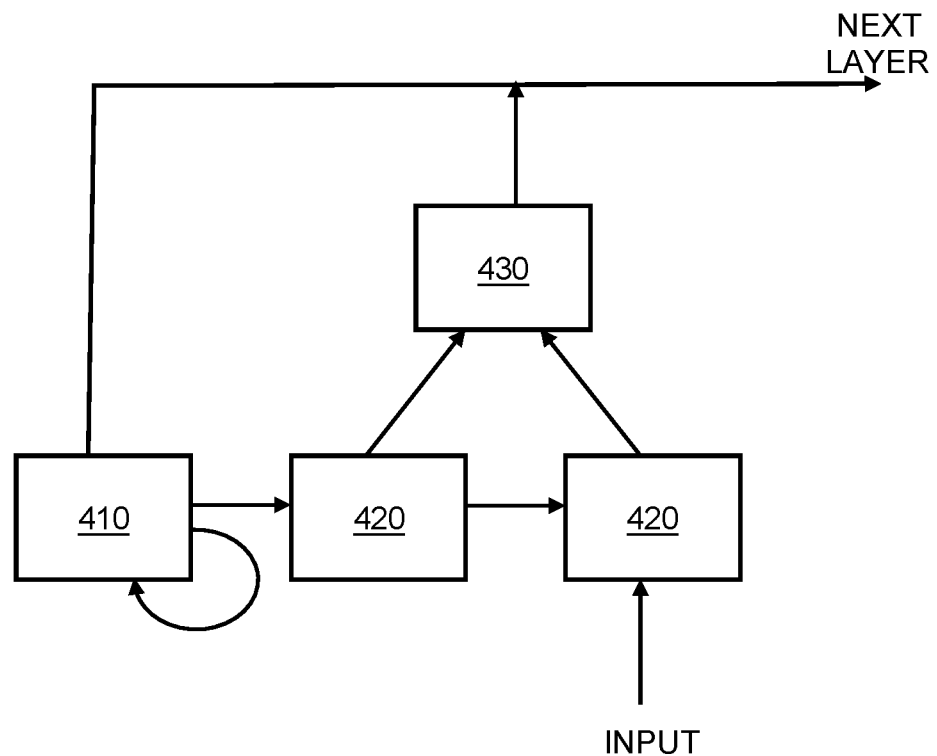
FIG. 4 provides a schematic illustration of a machine learning model, according to an embodiment of the invention.

FIG. 3 provides a schematic illustration 300, of the neural network architecture of model M as used in some embodiments of the inventions. NWP data and corresponding radar image pairs are provided as the training data set. As shown in the figure, the NWP data 310, is passed as inputs to multiple convolutional layers 320 and the model is trained to match the NWP data 310 to the corresponding radar images 340. In an embodiment, the model uses backpropagation, a leaky rectified linear unit (ReLU) activation function and a mean square error (MSE) regression loss function 330, to train the model parameters FIG. 4 provides a schematic illustration 400, of neural network layer architecture used in some embodiments for the advection model A. As provided in the figure, each network layer comprises an LSTM block 410 and several convolutional blocks 420. The LSTM block 410 accommodates the time sequence nature of the input data. In some embodiments, the model is trained using a leaky ReLU activation function and an MSE regression loss function 430. In an embodiment, model A is trained using data pairs including time series radar images and predicted radar images for the corresponding time window from model M.

Figure 5:
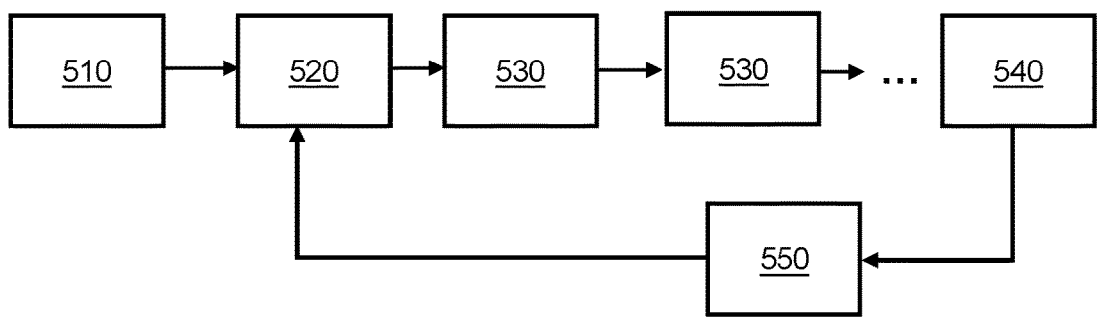
FIG. 5 provides a schematic illustration of a machine learning model, according to an embodiment of the invention.

FIG. 5 provides a schematic illustration 500, of an architecture for model D in some embodiments. As shown in the figure, the model includes 4-kilometer resolution data 510, input to a bilinear function 520 and several convolutional layers 530. The model is trained to match the 4-kilometer data with 1-kilometer resolution data 540 using backpropagation, a leaky ReLU activation function and an MSE loss function 550.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for generating predictive weather radar images, the method comprising:
   generating, by one or more computer processors, a first predictive radar image based upon weather forecast data using a first machine learning model; and
   generating, by the one or more computer processors, a second predictive radar image based upon the first predictive radar image and one or more first radar images using a second machine learning model.

2. The computer implemented method according to claim 1, wherein the weather forecast data relates to a specific location and time period.

3. The computer implemented method according to claim 2, wherein the first radar images relate to the specific location and time period.

4. The computer implemented method according to claim 1, wherein the first machine learning model is trained using weather forecast data and second radar images.

5. The computer implemented method according to claim 1, wherein the second machine learning model is trained using the second radar images and the first predictive radar images.

6. The computer implemented method according to claim 1, further comprising generating enhanced predictive radar images at multiple altitudes.

7. The computer implemented method according to claim 1, wherein the weather forecast data comprises precipitation data.

8. A computer program product for predicting weather radar images, the computer program product comprising one or more computer readable storage devices and stored program instructions on the one or more computer readable storage devices, the stored program instructions comprising:
program instructions to generate a first predictive radar image based upon weather forecast data using a first machine learning model; and
program instructions to generate a second predictive radar image based upon the first predictive radar image and one or more first radar images using a second machine learning model.

9. The computer program product according to claim 8, wherein the weather forecast data relates to a specific location and time period.

10. The computer program product according to claim 9, wherein the first radar images relate to the specific location and time period.

11. The computer program product according to claim 8, wherein the first machine learning model is trained using the weather forecast data and second radar images.

12. The computer program product according to claim 8, wherein the second machine learning model is trained using the second radar images and the first predictive radar images.

13. The computer program product according to claim 8, further comprising program instructions for generating enhanced predictive radar images at multiple altitudes.

14. The computer program product according to claim 8, wherein the weather forecast data comprises precipitation data.

15. A computer system for predicting weather radar images, the computer system comprising:
one or more computer processors;
one or more computer readable storage devices; and
stored program instructions on the one or more computer readable storage devices for execution by the one or more computer processors, the stored program instructions comprising:
program instructions to generate a first predictive radar image based upon weather forecast data using a first machine learning model; and
program instructions to generate a second predictive radar image based upon the first predictive radar image and one or more first radar images using a second machine learning model.

16. The computer system according to claim 15, wherein the weather forecast data relates to a specific location and time period.

17. The computer system according to claim 16, wherein the first radar images relate to the specific location and time period.

18. The computer system according to claim 15, wherein the first machine learning model is trained using the weather forecast data and second radar images.

19. The computer system according to claim 15, wherein the second machine learning model is trained using the second radar images and the first predictive radar images.

20. The computer system according to claim 15, further comprising program instructions for generating enhanced predictive radar images at multiple altitudes.

21. A computer implemented method for predicting weather radar images, the method comprising:
generating, by the one or more computer processors, a first predictive radar image based upon weather forecast data using a first machine learning model; and
generating, by one or more computer processors, a second predictive radar image based upon the first predictive radar image and one or more first radar images using a second machine learning model; and
generating, by the one or more computer processors, a high-resolution predictive radar image based upon the second predictive radar image using a third machine learning model.

22. The computer implemented method according to claim 21, wherein the weather forecast data relates to a specific location and time period.

23. The computer implemented method according to claim 22, wherein the first radar images relate to the specific location and time period.

24. A computer implemented method for predicting weather radar images, the method comprising:
generating, by one or more computer processors, a first predictive radar image based upon spatially interpolated weather forecast data using a first machine learning model;
generating, by the one or more computer processors, a second predictive radar image based upon the first predictive radar image and one or more first radar images using a second machine learning model; and
generating, by the one or more computer processors, a high-resolution predictive radar image based upon the second predictive radar image, by the one or more computer processors, using a third machine learning model.

25. The computer implemented method according to claim 24, wherein the weather forecast data relates to a specific location and time period.

* * * * *